Patented Feb. 23, 1943

2,311,784

UNITED STATES PATENT OFFICE 2,311,784

PREPARATION OF NITROUREA

Charles P. Spaeth, Woodbury, N. J., assignor to E. I. du Pont de Nemours & Company, Wilmington, Del., a corporation of Delaware No Drawing. Application October 29, 1940, Serial No. 363,295

6 Claims. (Cl. 260—553)

This invention relates to the manufacture of nitrourea.

Since the methods known to the art are characterized by certain inherent disadvantages, it is the object of this invention to effect an improved process for the production of nitrourea. A further object is a process wherein extremely low temperatures are unnecessary. Another object is a process characterized by superior yields, and a product of increased purity and stability. Other objects will be disclosed in the following.

I have found that the foregoing objects are accomplished and the disadvantages of the prior art overcome by maintaining urea nitrate in a crystallizing medium for nitrourea, in the presence also of a dehydrating agent capable of reversion to said crystallizing medium by combination with water. The urea nitrate is thereby converted to nitrourea, which can be separated by crystallization and filtration from the mother liquor. According to the above procedure, I may employ urea nitrate as my starting material, or I may start with urea and convert this to urea nitrate by addition of nitric acid and thence to nitrourea. Preferably, I follow the latter procedure, starting with urea.

The following examples are illustrative as specific embodiments of my invention merely and are not to be taken as limitations thereof.

Example 1

Ninety pounds of acetic anhydride was run into 900 pounds of concentrated acetic acid, and the mixture was heated to 60–63° C. Ninety pounds of dry urea nitrate was then added to the above solution. The reaction took place over a period of about 25 minutes. By this time, the urea nitrate had been converted to nitrourea and the latter dissolved in the reaction medium. The solution was cooled over a period of 60 minutes to around 27° C., at which temperature the nitrourea had separated out. The latter was freed from the greater part of the mother liquor on a nutsch filter, and was then transferred to another nutsch, where is was given six washes with a total of 350 pounds of benzene, whereby the process acetic acid was substantially removed. The material was then dried at around 40° C., and the benzene and last portions of acetic acid thereby eliminated. The nitrourea was reduced to a fine condition by screening. The product had a "nitro" nitrogen content of 13.20%, against a theoretical value of 13.33%. A total of 64.5 lbs. of nitrourea was obtained, about 84% of theory.

Example 2

Concentrated acetic acid in the amount of 450 lbs., resulting from a previous run, was taken, and 40 lbs. of urea was dissolved therein. Nitric acid of a concentration of 98.35%, and in the amount of 42.7 lbs., was added over a period of 27 minutes at 28–33° C., cooling means being employed, whereupon the urea was converted to urea nitrate. The mixture was then stirred for 5 minutes. One hundred pounds of acetic anhydride was then added over a 33-minute interval, the temperature being maintained at 30 to 65° C. by the use of steam coils. The reaction mixture was cooled to around 18° C. and the separated nitrourea was sucked dry on a filter. After transfer to another filter, it was given 6 washes with benzene. The material was dried and screened, as in Example 1. The nitrourea obtained amounted to 61.2 lbs., 87.5% of theory. It had a "nitro" nitrogen content of 13.26%. Material prepared in accordance with these examples, after two recrystallizations from water, had a melting point of 158.5° C., and showed a total nitrogren (Dumas) of 40.07% as compared with 40.0% theoretical.

As has been stated, a crystallizing medium for nitrourea is employed for the starting solution, together with a dehydrating agent compatible with nitrourea and capable of reversion to the crystallizing medium by combination with water. This differentiates advantageously over methods of the prior art where concentrated sulfuric acid has been used as initial solution. With concentrated sulfuric acid, there is a disadvantage that decomposition of nitrourea occurs at temperatures above 0° C. Consequently, sulfuric acid cannot function as a crystallizing medium, and the nitrourea can be recovered only by drowning in cold water. Even at 0° C., considerable nitrourea remains dissolved in the aqueous sulfuric acid solution.

By the use of a dehydrating agent that reverts to the crysallizing medium on combination with water, the presence in the system of an additional, final component is avoided. Various crystallizing media may be employed, for example, acetic acid and propionic acid. With such solvents, the dehydrating agents would be acetic anhydride and propionic anhydride, respectively. I find acetic acid and acetic anhydride the most advantageous crystallizing medium and dehydrating agent, respectively, because of their favorable properties and their availability. In the use of acetic acid, I find it advisable to use a solution of relatively high concentration, for example, 90 to 100% acetic acid. The important consideration, however, is that sufficient acetic anhydride be used to combine substantially with the water present, whether water of dilution, hydration, or that formed by the reaction. I do not wish to be bound, therefore, as to concentration of crystallizing medium. Substantially all the acetic acid may be recovered and returned to the system. The conversion of urea nitrate to nitrourea will ordinarily be carried out at a temperature between 30° and 70° C.

The nitric acid employed, when urea is the starting material, will be preferably of high concentration, for example, over 95% $HNO_3$, though this is not essential. Otherwise, however, an undesirably large amount of dehydrating agent will be required to react with the water introduced with the nitric acid.

In washing the final nitrourea product, a washing medium will be employed which preferably is a solvent for acetic acid or other crystallizing medium, but not for nitrourea, and one which has no decomposing effect on the nitrourea. I may use water under certain conditions, though lower yields may result from its use, due to its solvent effect. Preferably, I employ a non-aqueous solvent, for example, benzene, chloroform, carbon tetrachloride, ethyl ether, petroleum ether, acetic acid, and many others. I find benzene particularly adapted for use as washing medium, and this can, of course, be recovered substantially completely.

In some cases, I may prefer to carry out the conversion in the presence of a catalyst, for example, sulfuric acid, anhydrous sodium acetate and the like. A copending case has been filed covering a related method for the preparation of urea nitrate, Serial No. 365,021, filed September 9, 1940.

The process for the preparation of nitrourea, according to my invention, has been described in detail in the foregoing.

It will be understood, however, that many minor variations with respect to operations and amounts and kinds of reagents may be adopted without departure from the scope of the invention. I intend to be limited therefore only by the following claims.

I claim:

1. The method of preparing nitrourea, which comprises preparing a solution of urea nitrate with acetic acid, introducing acetic anhydride into the mixture in sufficient amount to combine with substantially all of the water present, heating the mixture to between 30° and 70° C. to convert the urea nitrate to nitrourea, cooling the reaction mixture, and separating said nitrourea.

2. The method of preparing nitrourea, which comprises preparing a solution of urea nitrate in concentrated acetic acid, introducing acetic anhydride into the mixture in sufficient amount to combine with substantially all of the water present, effecting conversion of said urea nitrate to nitrourea by heating to a temperature of 30–70° C., cooling said solution, separating the nitrourea, washing said nitrourea with a solvent for acetic acid, and removing said solvent and acetic acid from the nitrourea.

3. The method of preparing nitrourea, which comprises dissolving urea in acetic acid, adding nitric acid to said solution, introducing acetic anhydride into the mixture in sufficient amount to combine with substantially all of the water present, converting the urea to nitrourea, and separating said nitrourea.

4. The method of preparing nitrourea, which comprises dissolving urea in acetic acid, adding nitric acid to said solution, introducing acetic anhydride into the mixture in sufficient amount to combine with substantially all of the water present, and heating to a temperature between 30° and 70° C., thereby bringing about conversion to nitrourea, cooling said solution, and separating the nitrourea.

5. The method of preparing nitrourea, which comprises dissolving urea in concentrated acetic acid, adding to said solution concentrated nitric acid, thereby converting the urea to urea nitrate, introducing thereinto acetic anhydride in sufficient amount to combine with substantially all of the water present, effecting conversion of the urea nitrate to nitrourea by heating to a temperature of 30–70° C., cooling said solution, separating the nitrourea, washing said nitrourea with a solvent for acetic acid, and removing said solvent and acetic acid from the nitrourea.

6. The method of preparing nitrourea which comprises dissolving urea in an organic liquid taken from the group consisting of acetic acid and propionic acid, adding nitric acid to said liquid to form urea nitrate, introducing an anhydride of the organic acid in sufficient amount to combine with substantially all of the water present, converting the urea to nitrourea, and separating said nitrourea.

CHARLES P. SPAETH.